US006304656B1

United States Patent
Mou et al.

(10) Patent No.: US 6,304,656 B1
(45) Date of Patent: Oct. 16, 2001

(54) POWER SUPPLYING TO CPU OF TELEPHONE

(75) Inventors: Michael Mou; Fang-Te Chen, both of Tu-Cheng (TW)

(73) Assignee: Obtel Incorporated, Taipei Hsien (TW)

( * ) Notice: Subject to any disclaimer, the term of this patent is extended or adjusted under 35 U.S.C. 154(b) by 0 days.

(21) Appl. No.: 09/123,810

(22) Filed: Jul. 28, 1998

(51) Int. Cl.[7] .................................................. H04M 19/00
(52) U.S. Cl. ...................... 379/413.01; 379/413; 379/399
(58) Field of Search ............................... 379/443, 413.01, 379/413.04, 399.01, 387.01, 106.04

(56) References Cited

U.S. PATENT DOCUMENTS 5,555,301 * 9/1996 Boike et al. ......................... 379/413

* cited by examiner

Primary Examiner—Wing F. Chan
(74) Attorney, Agent, or Firm—Rosenberg, Klein & Lee

(57) ABSTRACT

An automatic power supplying device for providing power for a CPU of a telephone to activate the CPU and wake up a downstream circuit including for example a speech processor, a voice amplifier, etc., is disclosed. The automatic power supplying device includes a recharging circuit providing the power for the CPU for a predetermined period when there is a coining phone call and the telephone is hooked off. After the predetermined period, the CPU is supplied thereto power which is transmitted along the telephone line and accompanies the phone call signal. The CPU of the telephone is activated only when the telephone is in a hook-off state according to the present invention so that the life span of the CPU can be extended, compared to the conventional telephone.

8 Claims, 2 Drawing Sheets

POWER SUPPLYING TO CPU OF TELEPHONE

FIELD OF THE INVENTION

The present invention is related to a device for providing power for the CPU of a telephone, and more particularly to a device activated upon receiving a coming phone call for supplying power to the CPU of a telephone for a predetermined period.

BACKGROUND OF THE INVENTION

For a current telephone, a central processing unit (CPU) is used to control the telephone. The great performance of a CPU enhances the functions and applications of a telephone. Among the work terms of the CPU, one of them is to control the communication of the telephone with a telephone switchboard of the telephone company.

Please refer to FIG. 1 which is a schematic block diagram showing a conventional telephone. The telephone shown in FIG. 1 includes a hook switch 11, a state detector 12, a CPU 13, a control circuit 14, an electronic switch 15, a voltage regulator 17, a battery 18, and a downstream circuit 16 including a plurality of devices such as a speech processor, a voice amplifier, etc. When a phone call is made, a ringing signal is transmitted from the telephone switchboard 10 to the target telephone 1 to inform a user of the coming phone call.

When the user picks up the receiver (not shown) of the telephone, the hook switch 11 is conducted to be short-circuited so that the state detector 12 will inform the CPU 13 of the off-hook state. The CPU 13 then has the control circuit 14 conduct the electronic switch 15 to transmit speech signals from the switchboard 10 to the downstream circuit 16. Meanwhile, a power signal accompanying the speech signals and transmitted along the telephone line will be stabilized through the voltage regulator 17 as a working power signal, and fed to the CPU 13. The working power signal enters the downstream circuit for further conduction, and provides stable power for the CPU 13. The battery 18, however, provides power for the CPU 13 to monitor the hook state before the power transmitted along the telephone line achieves the CPU 13.

In the conventional telephone, it is necessary for the CPU 13 to keep an eye on the state of the hook switch 11, and the power needed for such a frequent monitoring operation is provided by the battery. Consequently, the life span of the CPU 13 will be quite limited, and the CPU will not be able to activate the electronic switch 15 if the battery 18 is power-empty.

SUMMARY OF THE INVENTION

An object of the present invention is to provide an automatic power supplying device which supplies power to a CPU of a telephone after there comes a phone call and before the power transmitted along the telephone line achieves the CPU, and provides power to conduct a downstream circuit.

The present invention is related to an automatic power supplying device of a telephone for supplying power when a phone call is directed to the telephone. The automatic power supplying device includes a switch for controlling a conduction of the phone call; a digital controller electrically connected to the switch for detecting the conduction of the phone call, and controlling a downstream operation concerning the phone call; and a recharging circuit electrically connected to the switch and the digital controller, and enabled by the conduction of the switch to provide power for the digital controller for a predetermined period.

The switch can be a button switch or a hook switch. The digital controller is preferably a central processing unit. The predetermined period is a time period less than 0.1 second.

Preferably, the automatic power supplying device further includes a voltage regulating circuit electrically connected to the digital controller. The digital controller receives a power signal accompanying the phone call and stabilized through the voltage regulating circuit as working power after the predetermined period. The voltage regulating circuit preferably include an electronic switch for controlling a conduction of a downstream circuit of the telephone; a control circuit electrically connected between the digital controller and the electronic switch for conducting the electronic switch in response to a control of the digital controller; and a voltage regulator electrically connected to the electronic switch, the digital controller and the recharging circuit for receiving a source power accompanying the phone call through the electronic switch, stabilizing the source power to obtain the power signal provided for the digital controller, and disabling the recharging circuit after the predetermined period.

The electronic switch can be a transistor.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
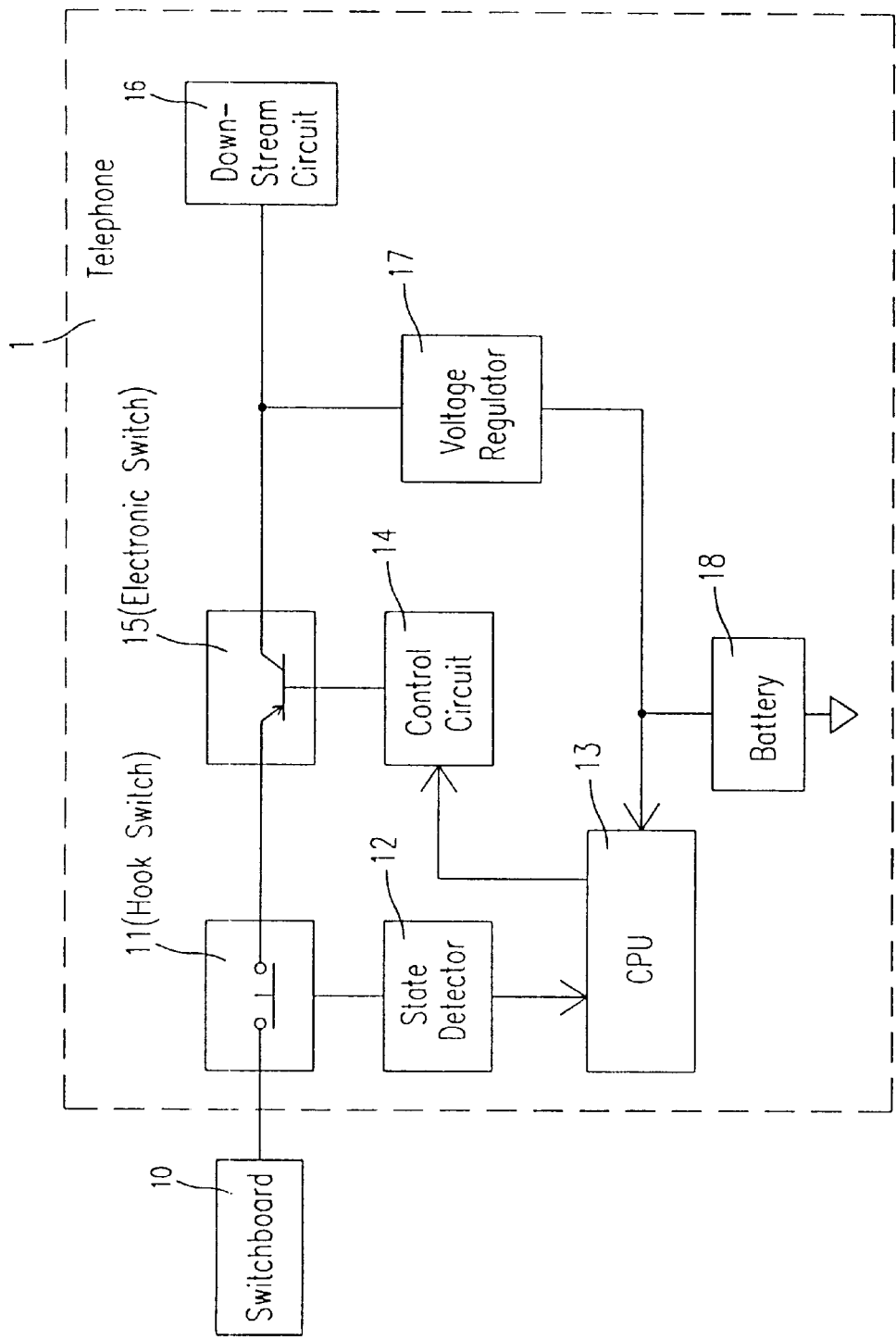
FIG. 1 is a schematic block diagram showing a conventional telephone.
Figure 2:
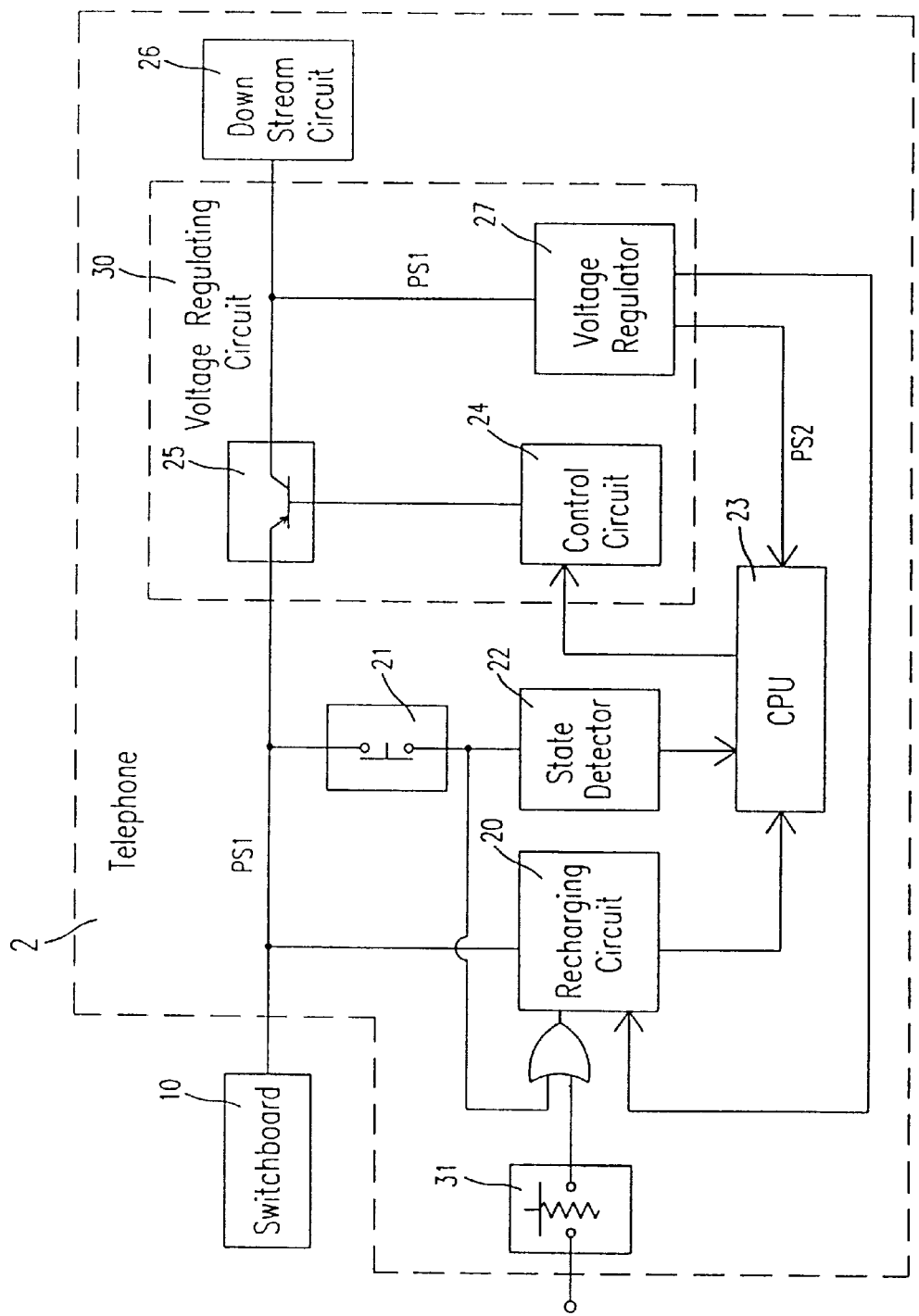
FIG. 2 is a schematic diagram showing a telephone including a preferred embodiment of an automatic power supplying device according to the present invention.

Please refer to FIG. 2 which schematically shows a preferred embodiment of an automatic power supplying device according to the present invention. The telephone 2 shown in FIG. 1 includes a recharging circuit 20, a hook switch 21, a state detector 22, a CPU 23, a voltage regulating circuit 30 including a control circuit 24, an electronic switch 25 and a voltage regulator 27, a button switch 31, and a downstream circuit 26 including a plurality of devices such as a speech processor, a voice amplifier, etc.

When a phone call is directed to the telephone 2, a ringing signal is transmitted from the telephone switchboard 10 to the telephone 2 to inform a user of the coming phone call. When the user picks up the receiver to conduct the hook switch 21 or presses a speaker button to conduct the button switch 31, the recharging circuit 20 is enabled to supply power to the CPU 23 for a time period of about 0.1 second or less owing to the circuitry design of the telephone. During this time period, the CPU 23 detects the conduction of the button switch 31 or the hook switch 21 though the state detector 22, and has the control circuit 24 conduct the electronic switch 25 which can be a transistor, thereby conducting the downstream circuit 26. Accompanying the phone call signal, a source power signal PS1 is transmitted through the electronic switch 25 and the voltage regulator 27, and stabilized by the voltage regulator 27 to be provided for the CPU 23 as working power PS2. After the time period is over, the voltage regulator 27 disables the recharging circuit 20 so that the system obtains power from the switchboard 10 along the telephone line instead of from the recharging circuit 20.

The predetermined time period when the charging circuit operates is preferably less than 0.1 second. It is because that the recharging circuit is equivalently a low-impedance circuit, and it will have adverse effect on the operation of the telephone if it still works during a normal communication process. In other words, the operation of the recharging circuit, i.e. waking up the CPU and other circuits, has to be completed and then disabled before the normal communication process is performed so as not to interfere with the communication. The time period less than 0.1 second is a preferable range.

It is to be noted that the CPU used in this preferred embodiment is just an example for illustration. Other digital controller performing the same functions can be used herein.

The present invention differs from the prior art in that no battery is needed for supporting the CPU to monitor the hook switch. Therefore, the CPU will not lose its function due to running out the battery power. In addition, the CPU according to the present invention is activated only and immediately when the telephone is hooked off, i.e. the hook switch or the button switch is conducted, so that it is not necessary for the CPU to frequently monitor the hook switch. Consequently, the life span of the CPU is lengthened, the cost for battery can be eliminated, and the reliability of the telephone can be enhanced.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic power supplying device of a telephone for supplying power when a phone call is directed to said telephone, comprising:

a switch for controlling a conduction of said phone call;

a digital controller electrically connected to said switch for detecting said conduction of said phone call, and controlling a downstream operation concerning said phone call; and a recharging circuit electrically connected to said switch and said digital controller, and enabled by said conduction of said switch to provide power for said digital controller for a predetermined period.

2. The device according to claim 1 wherein said switch is a button switch.

3. The device according to claim 1 wherein said switch is a hook switch.

4. The device according to claim 1 further comprising a voltage regulating circuit electrically connected to said digital controller, said digital controller receiving a power signal accompanying said phone call and stabilized through said voltage regulating circuit as working power after said predetermined period.

5. The device according to claim 4 wherein said voltage regulating circuit includes:

an electronic switch for controlling a conduction of a downstream circuit of said telephone;

a control circuit electrically connected between said digital controller and said electronic switch for conducting said electronic switch in response to a control of said digital controller; and a voltage regulator electrically connected to said electronic switch, said digital controller and said recharging circuit for receiving a source power accompanying said phone call through said electronic switch, stabilizing said source power to obtain said power signal provided for said digital controller, and disabling said recharging circuit after said predetermined period.

6. The device according to claim 5 wherein said electronic switch is a transistor.

7. The device according to claim 1 wherein said predetermined period is a time period less than 0.1 second.

8. The device according to claim 1 wherein said digital controller is a central processing unit.

* * * * *

UNITED STATES PATENT AND TRADEMARK OFFICE
CERTIFICATE OF CORRECTION

PATENT NO.    : 6,304,656 B1                                              Page 1 of 1
DATED         : October 16, 2001
INVENTOR(S)   : Michael Mou & Fang-Te Chen It is certified that error appears in the above-identified patent and that said Letters Patent is hereby corrected as shown below:

<u>Title page,</u>
Item [73], delete the Assignee Name "Obtel Incorporated" and insert -- Dbtel Incorporated --.

Signed and Sealed this

Fifth Day of March, 2002

Attest:

JAMES E. ROGAN
*Attesting Officer*        *Director of the United States Patent and Trademark Office*